United States Patent [19]

Dillon

[11] Patent Number: 4,978,512

[45] Date of Patent: Dec. 18, 1990

[54] COMPOSITION AND METHOD FOR SWEETENING HYDROCARBONS

[75] Inventor: Edward T. Dillon, Pasadena, Tex.

[73] Assignee: Quaker Chemical Corporation, Conshohocken, Pa.

[21] Appl. No.: 452,539

[22] Filed: Dec. 18, 1989

Related U.S. Application Data

[63] Continuation-in-part of Ser. No. 289,352, Dec. 23, 1988, abandoned.

[51] Int. Cl.$^{5}$ .............................................. C01B 17/05

[52] U.S. Cl. ...................................... 423/226; 423/228

[58] Field of Search ........................ 423/226, 228, 229

[56] References Cited

U.S. PATENT DOCUMENTS

| | | | |
|---|---|---|---|
| 2,761,818 | 9/1956 | Draemel et al. | 423/229 |
| 2,776,870 | 1/1957 | Fischer | 423/229 |
| 2,860,030 | 11/1958 | Goldtrap et al. | 423/229 |
| 4,107,270 | 8/1978 | Ferrin et al. | 423/226 |
| 4,112,049 | 9/1978 | Bozzelli et al. | 423/226 |
| 4,436,713 | 3/1984 | Olson | 423/573 |
| 4,443,423 | 4/1984 | Olson | 423/573 |
| 4,515,759 | 5/1985 | Barnes et al. | 423/220 |
| 4,680,127 | 7/1987 | Edmondson | 210/749 |
| 4,748,011 | 5/1988 | Baize | 423/228 |

OTHER PUBLICATIONS

Chem. Abstracts 90: 22869t.

*Primary Examiner*—Anthony McFarlane
*Attorney, Agent, or Firm*—Panitch Schwarze Jacobs & Nadel

[57] ABSTRACT

Methods are disclosed for selectively reducing the levels of hydrogen sulfide and oragnic sulfides from gaseous and/or liquid hydrocarbon streams, particularly natural gas streams, compromising contacting the streams with a composition comprising the reaction product of (i) a lower alkanolamine with (ii) a lower aldehyde.

21 Claims, No Drawings

COMPOSITION AND METHOD FOR SWEETENING HYDROCARBONS

CROSS-REFERENCE TO RELATED APPLICATION

This application is a continuation-in-part of my copending U.S. application Ser. No. 289,352, filed Dec. 23, 1988 for "Composition and Method for Sweetening Natural Gas" now abandoned.

FIELD OF THE INVENTION

The present invention relates to a method and composition for sweetening gaseous and/or liquid hydrocarbon streams. More specifically, this invention relates to a method and composition for reducing the hydrogen sulfide and organic sulfide levels in such streams particularly natural gas streams.

BACKGROUND OF THE INVENTION

Natural gas is a naturally occurring mixture of hydrocarbon and non-hydrocarbon gases found in geologic formations beneath the earth's surface, often in association with petroleum. As obtained from oil and gas wells, raw or sour natural gas contains a number of impurities which must be removed before being introduced into a pipeline. The principal impurities in natural gas are water, carbon dioxide, hydrogen sulfide and condensable hydrocarbons, such as propane, butane and pentane. These undesirable components are conventionally removed from raw natural gas streams in gas processing plants. The processing plants are normally located in the field and vary in size from small units to large, centrally located plants.

The composition of raw natural gas varies widely from field to field. For example, the methane content can vary between 45 percent and 96 percent by volume, while the hydrogen sulfide content may range from 0.1 ppm to 150,000 ppm. Since hydrogen sulfide is corrosive in the presence of water and poisonous in very small concentrations, it must be almost completely removed from natural gas streams before use and preferably before transport. As a result, many pipeline specifications limit the amount of hydrogen sulfide to less than 0.25 gr per 100 cu. ft. of gas.

The technology known in the art for removing hydrogen sulfide from raw natural gas was developed for large processing plants to remove hydrogen sulfide in continuous processes. These large processing plants are fed by one or more natural gas wells, each of which produces over 10 million cubic feet of natural gas per day. Many of these processes utilize commodity chemicals or proprietary materials to lower the hydrogen sulfide levels in natural gas to pipeline specifications. Also, many of these processes not only sweeten sour natural gas to pipeline specifications, but also regenerate most, if not all, of the sweetening compositions involved.

Generally, there are several methods for sweetening sour gas, i.e., for reducing the hydrogen sulfide content of new gas. For example, various chemicals may be added or injected "in-line" to natural gas pipelines. For example, these sweetening products may be injected at the well head, separators, glycol units, coolers, compressors, etc., to provide contact with the natural gas.

Materials used with such "in-line" injection systems include, e.g., various aldehydes. The hydrogen sulfide reacts rapidly with the aldehyde compounds producing various types of addition products, such as polyethylene sulfide, polymethylene disulfide and trithiane. Such a process is disclosed, e.g., in Walker, J. F., *Formaldehyde*, Rheinhold Publishing Company, New York, page 66 (1953).

U.S. Pat. No. 4,748,011 discloses a method for the separation and collection of natural gas comprising the use of a sweetening solution. The sweetening solution consists of an aldehyde, a ketone, methanol, an amine inhibitor, sodium or potassium hydroxides and isopropanol. The amine inhibitor includes alkanolamines to adjust the pH.

Although the aldehydes (e.g., formaldehyde) are effective in the reduction of the hydrogen sulfide level of natural gas and selective for sulfide compounds, they are known to form trithiane compounds upon reaction with the sulfides. The trithianes are solids which do not easily dissolve and therefore, clog gas lines.

Also, aldehydes are unstable, temperature sensitive and have the tendency to polymerize. Moreover, aldehydes are known carcinogens and environmental hazards. Accordingly, the use of aldehydes for sweetening natural gas has come under disfavor.

Alkanolamines may also be used to sweeten sour gas streams, e.g., in such "in-line" injection systems. Various alkanolamines may be used in such systems, e.g., monoethanolamine, diethanolamine, methyldiethanolamine and diglycolamine. For example, U.S. Pat. No. 2,776,870 discloses a process for separating acid components from a gas mixture comprising adding to the gas an absorbent containing water-soluble alphatic amines an alkanolamines, preferably ethanolamine.

However, the alkanolamines are not selective in their reaction with hydrogen sulfide. That is, alkanolamines absorb the total acid-gas components present in the gas stream, e.g., carbon dioxide, as well as $H_2S$. Such non-selectivity is not desirable in many applications and therefore, the usage of alkanolamines has also come under disfavor for this reason.

Another method used for the reduction of the hydrogen sulfide level in gas streams is the use of an $H_2S$ scrubber tower which causes the gas to contact a sweetening medium. The bubble tower processes are batch or one-step processes which increase the opportunity for contact between the natural gas and the sweetening product by providing a gas diffusion zone by way of, e.g., disparges, pall rings, wood chips, etc.

Sweetening materials used in such scrubber tower apparatuses include, e.g., the so-called "iron-sponges". The iron-sponge is actually a sensitive, hydrated iron oxide supported on wood chips or shavings. The iron oxide selectively reacts with the hydrogen sulfide in the gas to form iron sulfide. Although effective, the iron-sponge method is disadvantageous in that the final product is not easily disposed of (see, e.g., *The Field Handling of Natural Gas*, p 74, 3rd Ed (1972)).

Slurries of zinc oxide and iron oxides have also been used in such scrubber towers to effect sweetening in much the same way as the iron-sponge. However, disposal problems also exist with these slurries.

Caustic-based systems, such as those containing nitrites, may also be used in scrubber towers. Although effective, such systems produce elemental sulfur solids. An example of such a system is marketed by NL Industries under the name "SULFACHECK" and disclosed in U.S. Pat. No. 4,515,759. "SULFACHECK" is a buffered aqueous solution of sodium nitrite which is injected into scrubber towers to sweeten natural gas. This solvent is designed for use in a one-step batch process, wherein the hydrogen sulfide is removed from a raw natural gas stream through a reaction with the sodium nitrite.

Such caustic-based sweetening materials are undesirable since, as noted above, they produce solids (i.e., elemental sulfur). Accordingly, such systems cannot be used in "in-line" injection systems and may only be used in bubble towers. Moreover, such caustic-based sweetening systems are not regenerable, i.e., they must be used in a batch process.

Another known method for sweetening natural gas is the chemical solvent process. The chemical solvent process is a continuous process, whereby a sweetening solution is contacted with the gas stream in an absorber tower. In such a process, the total acid gases, including hydrogen sulfide and carbon dioxide are stripped off of the sweetening solution which is then regenerated. The chemical solvent processes cannot be performed in-line.

Alkanolamines of various types may also be used in these chemical solvent processes. However, as discussed above, the use of alkanolamines is limited due to their lack of selectivity for hydrogen sulfide and other organic sulfides in the gas streams.

Other chemical solvents known in the art and used for sweetening gas streams include piperazinone, as disclosed in U.S. Pat. No. 4,112,049; 1-formylpiperidine, as disclosed in U.S. Pat. No. 4,107,270; iron (III) complexes of N-(2-hydroxyethyl) EDTA, as disclosed in U.S. Pat. No. 4,107,270; and iron complexes of nitriloacetic acid, as disclosed in U.S. Pat. Nos. 4,436,713 and 4,443,423.

Accordingly, there is a need in the art for a method for the reduction in the levels of hydrogen sulfide and organic sulfides from sour hydrocarbon streams which not only substantially reduces the sulfide levels therein, but which is also unaffected by storage temperature, stream temperature or the sulfide reaction temperature; which causes little or no health hazards; which selectively reacts with hydrogen sulfide; and which does not form a precipitate upon reaction with hydrogen sulfide and organic sulfides.

SUMMARY OF THE INVENTION

The above objectives have been obtained by the present method for selectively reducing the levels of hydrogen sulfide and organic sulfides from gaseous and/or liquid hydrocarbon streams which comprises contacting the stream with a composition comprising the reaction product of (i) a lower alkanolamine with (ii) a lower aldehyde. This method may be used in a variety of installations, including for example, in-line injection systems, $H_2S$ scrubber systems or chemical solvent systems. There is also disclosed a method for reducing the levels of hydrogen sulfide, organic sulfides and water, using the present method with the addition of a glycol.

DETAILED DESCRIPTION OF THE PREFERRED EMBODIMENTS

The present method comprises the addition of the reaction product of (i) a lower alkanolamine and (ii) a lower aldehyde, to gaseous and/or liquid hydrocarbon streams to selectively reduce the level of hydrogen sulfide and organic sulfides therein. The present method may be used to selectively reduce the level of sulfides in both sour natural gas and liquified petroleum gas (e.g., butane) systems.

The present method provides a selective and almost instantaneous reaction with the sulfides present in the gas streams, producing no precipitate solids or deleterious environmental effects. Also, the efficacy of the hydrogen sulfide reduction is not affected by the concentration of the carbon dioxide in the gas, the storage temperature, the gas temperature, the sulfide reaction temperature, or the pressure of the system.

The reaction products of the present invention selectively react with sulfides present in sour gaseous or liquid hydrocarbon streams regardless of the $CO_2$ level in the stream, forming water-soluble and easily removable products.

The lower alkanolamines represented by (i) are preferably those alkanolamines having 1 to about 6 carbons. More preferably, the lower alkanolamines represented by (i) are mono- or di-alkanolamines. Most preferably, the alkanolamine represented by (i) is monoethanolamine.

The lower aldehydes represented by (ii) are preferably those aldehydes having 1 to about 4 carbons. More preferably, the aldehyde is formaldehyde or acetaldehyde.

The reaction products of (i) and (ii) comprise primarily a mixture of a triazine and a bisoxazolidine, although other intermediates and/or polymers thereof may be present. Preferably, the reaction product of the present invention is that formed by the reaction of (i) monoethanolamine and (ii) formaldehyde, i.e., N,$N^1$-methylene bisoxazolidine; 1,3,5 tri-(2-hydroxyethyl)-hexahydro-S-triazine; and mixtures thereof.

The reaction product of the present invention is extremely selective in its ability to react with sulfides, e.g., hydrogen sulfides, carbonyl sulfides and carbon disulfides, etc., in the presence of any amount of carbon dioxide. Such selective removal of sulfides is advantageous and economical, particularly, in systems wherein a simultaneous reduction in the amount of carbon dioxide is not desirable.

In the reaction of (i) a lower alkanolamine and (ii) a lower aldehyde to obtain the reaction product of the present invention, the relative molar ratios of (i) to (ii) may be from about 1:0.25 to about 1:10. Preferably, the molar ratio of (i) to (ii) is from about 1:1 to about 1:1.5.

The relative amounts of the components produced from the reaction of (i) and (ii) above depend on the stoichiometry of the reaction. That is, it appears that when the molar ratio of (i) to (ii) is about 1:1, the end result is a higher concentration of the triazine compounds. On the other hand, when the molar ratio of (i) to (ii) is about 1:1.5, the resultant reaction product will have a relatively higher concentration of the bisoxazolidine compound. However, as confirmed by mass and NMR spectral observations conducted on the reaction product of the present invention, the reaction product of (i) and (ii) generally comprises a combination or mixture of the triazine and bisoxazolidine compounds.

The reaction product of (i) with (ii) comprises a molar ratio of triazine to bisoxazolidine of between about 99:1 and about 80:20 and preferably, about 95:5, when the molar ratio of (i) to (ii) is about 1:1.

Preferably, the reaction product of the present invention is that formed by the reaction of monoethanolamine and formaldehyde. The molar ratio of monoethanolamine to formaldehyde is from about 1:0.25 to about 1:10 and preferably, about 1:1 to about 1:1.5.

The reaction of (i) and (ii) is an exothermic reaction which occurs without the necessity of adding heat, although heat may be added in a controlled manner. The extent of heat which may be added to the reaction of (i) and (ii) is variable and will be evident to one skilled in the art based upon the particular application. Without control of the temperature, the reaction product changes in composition and color, proceeding from white to yellow to amber. An amber reaction product has been found to be unsatisfactory for use in at least some of the sweetening methods discussed below.

In general, it is preferred to maintain the temperature of the reaction of (i) and (ii) in the range of about 130° to about 150° F., and preferably about 135° to about 140° F. The reaction temperature may be controlled in any suitable manner known in the art, such as by, e.g., the addition of cold water or ice to the reaction mixture or by the use of a heat exchanger.

The reaction is also preferably carried out in aqueous solution since the lower aldehyde component is commercially provided in aqueous solution, and the commercial lower alkanolamines contain about 15 percent water. Commercial lower aldehyde solutions may also contain about 7 percent to about 14 percent methanol as a polymerization inhibitor.

The addition of methanol to the composition comprising the reaction product of (i) and (ii) may be desired, as the methanol serves as an antifreeze for use in the field. Accordingly, for some applications, it is preferred to premix methanol with the present composition prior to contact with the gas streams. Such applications, as well as the appropriate amounts of methanol to be used, will be evident to one skilled in the art based upon the specific application.

When (i) is represented by monoethanolamine and (ii) is represented by formaldehyde, the reaction product is predominately $N,N^1$ methylene bisoxazolidine; 1,3,5 tri-(2-hydroxy-ethyl)-hexahydro-S-triazine; or a mixture thereof. Again, the relative amounts of the components comprising the present reaction product in the final composition can be controlled by varying the stoichiometry of the reactants as discussed above.

In the selective removal of hydrogen sulfide from sour natural gas, the method of the present invention may be used with any conventional gas treatment method.

For example, the present method may be employed with "in-line" injection systems to reduce the hydrogen sulfide level in sour gas streams. The composition comprising the present reaction products may be injected at any point in-line which will provide the reaction product the opportunity to react with the gaseous or liquid hydrocarbon stream, e.g., at the well-head, at the separators, etc. In an in-line injection system, the temperature and pressure of the gas system is not critical for the success of the present method. The variation of temperatures and pressures within the system will be evident to one skilled in the art based upon the present disclosure and the particular system being used.

When the present method is used with an in-line injection system, the gas should contain at least about 7 pounds of water per MMscf ($10^6$ standard cubic feet), in order to disperse the water-soluble end product. Also, when using the in-line injection method, the composition comprising the reaction product of the present invention may be injected directly into the flow line at a rate of between about 0.3 to about 1.0 gallons per ppm hydrogen sulfide per MMscf of gas. However, rate of injection may be varied from system to system as will be evident to one skilled in the art based upon the present disclosure.

The instant method may also be used with $H_2S$ scrubber towers or chemical solvent processes. In each of these systems, towers are used to increase the contact time between the reaction product and the gaseous hydrocarbon stream, thereby improving efficiency over the in-line system.

In the scrubber tower system the composition comprising the present reaction products may be used in an amount of about 0.05 to about 0.15 gallons per ppm $H_2S$ per Mscf of gas ($10^3$ standard cubic feet). The scrubber tower is the preferred apparatus in which to sweeten hydrocarbon streams according to the present method, due to its high efficiency and the relatively low capital investment required.

In the chemical solvent process, the acid gases ($CO_2$, $H_2S$, etc.) are stripped from the present reaction products after the sweetening reaction. Accordingly, in such a system, the present reaction product may be part of a continuous, recirculating process and may be regenerated and reused. The amount of the composition comprising the present reaction products which is to be used in a chemical solvent system is variable depending upon the particular application (e.g., the tower size, the amount of sulfides present in the gas, etc.). Appropriate amounts of the present reaction product useful in such a system will be evident to one skilled in the art based upon the present disclosure.

Generally, in any system in which the present method is employed, the reaction temperature (i.e. the reaction of the present composition with the hydrogen sulfide and organic sulfides) in the system should not exceed about 200° F.

The hydrogen sulfide level in a natural gas stream may be reduced from about 10,000 ppm to about 3 ppm or less when the method of the present invention is employed, although the method is not limited to such amounts.

The reaction product of (i) and (ii) is also useful for purposes other than the reduction of hydrogen sulfide levels in sour gaseous or liquid hydrocarbon streams. For example, in wells which produce natural gas which is both sour and wet (i.e., contains undesirable amounts of both hydrogen sulfide and water), the reaction product of (i) and (ii) may be premixed with a glycol prior to contact with the gas to selectively reduce both the hydrogen sulfide and water levels in the gas.

In such a procedure, the amount of the composition comprising the reaction product of (i) and (ii) to the amount of glycol is about 90 to about 10 volume percent and preferably, about 50 to about 50 volume percent, with the remainder of the mixture, if any, being water. However, the composition of this mixture may be varied as will be evident to one skilled in the art, based upon the relative amounts of hydrogen sulfide and water present in the gas stream. That is, if relatively higher amounts of hydrogen sulfide exist in the gas stream, a higher weight percent of the composition comprising the reaction product of (i) and (ii) may be added to this mixture relative to the glycol. Conversely, if higher relative amounts of water are present in the natural gas, a higher weight percent of the glycol may be added to the mixture relative to the present reaction product.

Although any glycol may be used in this manner, triethylene glycol is preferably employed. However, the use of different glycols will be evident to one skilled in the art based upon the present disclosure.

It has also been determined that the spent or waste reaction product (i.e., that reaction product which has been contacted with the gas stream and has reacted with the hydrogen sulfide or organic sulfides present in the stream) has useful corrosion inhibition properties. Although the applicant does not wish to be bound to any one theory, it is believed that this corrosion inhibition is caused by the physical adsorption of the composition comprising the present reaction products on the metal surfaces of the gas line.

Also, the spent or waste reaction product of (i) and (ii) referred to above, possesses dispersant properties which are useful in gas systems. More specifically, any solids present in natural gas lines are dissolved and dispersed in the waste liquid material and thereby washed away or cleared from the gas lines.

The invention will now be illustrated further with reference to the following specific, non-limiting examples.

PREPARATION EXAMPLE

To a blending vessel provided with recirculation means, 406.5 gallons (27.1 percent by volume) of an aqueous formaldehyde solution (37 percent formaldehyde with 7 percent methanol) was added. Once recirculation had been established, 300 gallons (20 percent by volume) of 85 percent monoethanolamine was added slowly in three approximately equal increments (100, 95 and 105 gallons). The addition of the first increment took about 45 minutes, and the second and third additions took approximately another 45 minutes.

Since the temperature of the mixture did not rise above 140° F. after addition of the first increment of monoethanolamine solution, no water was added for cooling purposes. Then, the second increment of 85 percent monoethanolamine solution was added slowly to the batch, and water was also added in an amount sufficient to keep the reaction temperature between about 135° F. and about 140° F. Next, the remainder of the monoethanolamine solution wa added.

After all of the monoethanolamine solution has been added, while recirculating, the reaction mass wa allowed to cool by at least about 10° F. Such a drop in temperature is an indication that a chemical reaction is not taking place. Once this 10° F. drop occurred, the remainder of the water (529.5 gallons total or 35.3 percent by volume) was added as ice. This accelerated the cooling process. When the batch temperature dropped to about 100° F., methanol was added to the batch in an amount of about 264 gallons (17.6 percent by volume).

Upon qualitative analysis of the reaction product of the present invention, it has been found that the higher the percentage of tertiary amine(s) present in the reaction product, the more efficient the product is at scavenging hydrogen sulfide. The presence of tertiary amine(s) in the reaction product is an indication of the stage of the reaction between the alkanolamine and the aldehyde. Specifically, the percentage of tertiary amine is an indication of the extent that condensation of the alkanolamine and the aldehyde has taken place to form the bisoxazolidine and/or triazine structures. The present reaction product has been found to be most effective in scavenging hydrogen sulfide when the percentage of tertiary amine(s) is about 70 percent or greater.

The percentage of tertiary amine present in the reaction product may be determined by dissolving a 1 gram sample of the reaction product in 50 ml of isopropyl alcohol and adding 5 ml of phenyl isothiocyanate. The sample was allowed to stand for 30 minutes. 2 drops of bromophenol blue was then added to the mixture. The mixture was then titrated with 0.1 N HCl to a pH of 3.5 using an Orion Researcher pH meter. The percentage of tertiary amine(s) present in the sample was determined by the following formula:

$$\%3^\circ\ \text{Amine} = \frac{3^\circ\ \text{Amine value}}{\text{Total Amine Value}},$$

the total amine value being the sum of the 1°, 2° and 3° amine values. The 1° and 2° amine values are determined following the procedure set forth above, except that for 2° amines, 5 ml of 98% salicylaldehyde is used in place of phenyl isothiocyanate. For the 1° amine value this step is deleted.

USE EXAMPLE

In the following example, the use of the present method in a scrubber tower system is demonstrated.

A fifteen foot by six foot scrubber tower in the Texas Gulf Coast which handled 120 to 200 Mscf per day of gas containing more than 400 ppm of hydrogen sulfide was treated as follows.

275 gallons of the present composition was charged into the tower in combination with 275 gallons of fresh water. The scrubber tower was allowed to contact the natural gas stream in the usual, uninterrupted manner.

The present composition was entirely spent in two months and the concentration of hydrogen sulfide in the gas was determined. The concentration of hydrogen sulfide in the gas was reduced to 0 ppm. The spent composition was easily drained from the tower and the tower was immediately rechargeable. No cleaning of the tower was necessary, i.e., no deposits were formed from the reaction of the present composition with hydrogen sulfide.

In comparison, the same scrubber tower was charged with 550 gallons of the nitrite composition of U.S. Pat. No. 4,515,759 and 550 gallons of fresh water. After two months, the hydrogen sulfide level of the gas was also reduced to about 0 ppm. However, the nitrite system required steam cleaning which took about 1–1½ days in order to remove precipitated sulfur and other solids. During such steam cleaning, the system was down and additional gas could not be sweetened.

The present invention may be embodied in other specific forms without departing from the spirit or essential attributes thereof and, accordingly, reference should be made to the appended claims, rather than to the foregoing specification as indicating the scope of the invention.

What is claimed:

1. A method for selectively reducing the levels of hydrogen sulfide and organic sulfides present in gaseous or liquid hydrocarbon streams or mixtures thereof comprising contacting said streams with a composition comprising the reaction product of (i) an alkanolamine comprising 1 to about 6 carbons with (ii) an aldehyde comprising 1 to about 4 carbons, for a period of time sufficient to reduce the levels of hydrogen sulfide and organic sulfides in said streams.

2. A method as in claim 1, wherein (i) is monoethanolamine and (ii) is formaldehyde.

3. A method as in claim 1, wherein said reaction product is selected from the group consisting of triazine, bisoxazolidine and mixtures thereof.

4. A method as in claim 1, wherein said reaction product comprises N,N[1]-methylenebisoxazolidine.

5. A method as in claim 1, wherein said reaction product comprises 1,3,5 tri-(2-hydroxyethyl)-hexahydro-S-triazine.

6. A method as in claim 1, wherein said reaction product comprises a mixture of N, N[1]-methylenebisoxazolidine and 1,3,5 tri-(2-hydroxyethyl)-hexahydro-S-triazine.

7. A method as in claim 1, wherein the reaction takes place at a temperature of not greater than about 200° F.

8. A method as in claim 1, wherein the molar ratio of the said lower alkanolamine to said lower aldehyde is from about 1:0.25 to about 1:10.

9. A method as in claim 8, wherein the molar ratio of said lower alkanolamine to said lower aldehyde is from about 1:1 to about 1:1 5.

10. A method as in claim 1, wherein said reaction product comprises a molar ratio of said triazine to said bisoxazolidine of between about 99:1 and about 80:20.

11. A method as in claim 1 wherein said reaction product has a tertiary amine content of at least about 70%.

12. A method as in claim 1, wherein said composition is contacted with said streams in an $H_2S$ scrubber tower.

13. A method as in claim 1, wherein said composition is injected in-line into said streams.

14. A method as in claim 13, wherein said composition is injected at the well-head.

15. A method as in claim 1, wherein said composition further includes methanol.

16. A method for selectively reducing the levels of hydrogen sulfide, organic sulfides and water present in gaseous or liquid hydrocarbon streams or mixtures thereof comprising contacting said streams with a composition comprising (1) the reaction product of (i) an alkanolamine comprising 1 to about 6 carbons with (ii) an aldehyde comprising 1 to about 4 carbons and (2) a glycol, for a period of time sufficient to reduce the levels of hydrogen sulfide, organic sulfides and water in said streams.

17. A method as in claim 16, wherein said glycol is triethylene glycol.

18. A method for selectively reducing the levels of hydrogen sulfide and organic sulfides present in gaseous or liquid hydrocarbon streams or mixtures thereof comprising contacting said streams with a composition comprising a triazine, for a period of time sufficient to reduce the levels of hydrogen sulfide and organic sulfides in said streams.

19. A method as in claim 18, wherein said triazine is 1,3,5 tri-(2-hydroxyethyl)-hexahydro-S-triazine.

20. A method for selectively reducing the levels of hydrogen sulfide, organic sulfides and water present in gaseous or liquid hydrocarbon streams or mixtures thereof comprising contacting said streams with a composition comprising a triazine and a glycol, for a period of time sufficient to reduce the levels of hydrogen sulfide, organic sulfides and water in said streams.

21. A method as in claim 20 wherein said triazine is 1,3,5 tri-(2-hydroxyethyl)-hexahydro-S-triazine.

* * * * *

UNITED STATES PATENT AND TRADEMARK OFFICE
CERTIFICATE OF CORRECTION

PATENT NO. : 4,978,512

DATED : December 18, 1990

INVENTOR(S) : Edward T. Dillon

It is certified that error appears in the above-identified patent and that said Letters Patent is hereby corrected as shown below:

In the Abstract, at line 2, "oragnic" should read --organic--; at line 4, "compromising" should read --comprising--.

In the Specification, at column 2, line 31, "alphatic" should read --aliphatic--; at column 2, line 32, "an" should read --and--; at column 4, line 31, "N,N'" should read --N,N'--; at column 4, line 32, "1,3,5 tri-(2-hydroxyethyl)-hexahydro-S-" should read --1,3,5 tri-(2-hydroxyethyl)-hexahydro-s- --; at column 5, line 37, "N,N'" should read --N,N'--; at column 5, line 38, "tri-(2-hydroxy-ethyl)-hexahydro-S-triazine" should read --tri-(2-hydroxy-ethyl)-hexahydro-s-triazine--; at column 6, line 13, "per Mscf of gas ($10^3$ standard cubic feet)" should read --per MMscf of gas ($10^6$ standard cubic feet)--; at column 7, lines 42 and 44, "wa" should read --was--.

UNITED STATES PATENT AND TRADEMARK OFFICE
CERTIFICATE OF CORRECTION

PATENT NO. : 4,978,512

DATED : December 18, 1990

INVENTOR(S) : Edward T. Dillon

It is certified that error appears in the above-identified patent and that said Letters Patent is hereby corrected as shown below:

In the Claims, claim 6, line 2, "N,N$^1$" should read --N,N'--; claim 6, line 3, "1,3,5 tri-(2-hydroxyethyl)-hexahydro-S-" should read --1,3,5 tri-(2-hydroxyethyl)-hexahydro-s- --; claim 19, line 2, "1,3,5 tri-(2-hydroxyethyl)-hexahydro-S-triazine" should read --1,3,5 tri-(2-hydroxyethyl)-hexahydro-s-triazine--; claim 21, line 2, "1,3,5 tri-(2-hydroxyethyl)-hexahydro-S-triazine" should read --1,3,5 tri-(2-hydroxyethyl)-hexahydro-s-triazine--.

Signed and Sealed this

Twenty-ninth Day of September, 1992

Attest:

DOUGLAS B. COMER

Attesting Officer

Acting Commissioner of Patents and Trademarks

US004978512B1

REEXAMINATION CERTIFICATE (2041st)

United States Patent [19]

[11] B1 4,978,512

Dillon

[45] Certificate Issued Jun. 15, 1993

[54] COMPOSITION AND METHOD FOR SWEETENING HYDROCARBONS

[75] Inventor: Edward T. Dillon, Pasadena, Tex.

[73] Assignee: Quaker Chemical Corporation, Wilmington, Del.

Reexamination Request:
No. 90/002,728, May 15, 1992

Reexamination Certificate for:

| | |
|---|---|
| Patent No.: | **4,978,512** |
| Issued: | **Dec. 18, 1990** |
| Appl. No.: | **452,539** |
| Filed: | **Dec. 18, 1989** |

Certificate of Correction issued Sep. 29, 1992.

Related U.S. Application Data

[63] Continuation-in-part of Ser. No. 289,352, Dec. 23, 1988, abandoned.

[51] Int. Cl.[5] .............. C01B 17/05

[52] U.S. Cl. .............. 423/226; 423/228; 423/229; 208/189; 252/8.555

[58] Field of Search .............. 423/226, 228, 229; 252/8.555, 392; 422/7; 208/189

[56] References Cited

U.S. PATENT DOCUMENTS

| | | | |
|---|---|---|---|
| 2,496,596 | 2/1950 | Moyer et al. | 252/8.55 |
| 2,596,273 | 5/1952 | Moyer et al. | 252/8.55 |
| 2,596,425 | 5/1952 | Moyer et al. | 252/8.55 |
| 4,202,882 | 5/1980 | Schwartz . | |
| 4,267,162 | 5/1981 | Maier | 423/542 |
| 4,368,059 | 1/1983 | Doerges et al. | 55/73 |
| 4,405,580 | 9/1983 | Stogryn et al. . | |
| 4,435,371 | 3/1984 | Frech et al. . | |
| 4,455,287 | 6/1984 | Primack et al. . | |
| 4,498,911 | 2/1985 | Deal et al. | 55/32 |
| 4,530,827 | 7/1985 | Heisel et al. | 423/575 |
| 4,532,116 | 7/1985 | Doerges et al. | 423/226 |
| 4,578,208 | 3/1986 | Geke et al. . | |
| 5,061,373 | 10/1991 | Gallup . | |

FOREIGN PATENT DOCUMENTS 2-180698 7/1990 Japan .

OTHER PUBLICATIONS

J. F. Walker, *Formaldehyde*, Reinhold, New York, 1964, pp. 360–361; p. 247 (1975).

EPC Design Manual "Odor and Corrosion Control in Sanitary Sewerage Systems and Treatment Plants", EPC/625/1-85/018 (1985).

"Odor and Corrosion Control in Sanitary Sewerage Systems and Treatment Plants", Bowker et al., Noyes Data Corporation, pp. 52–61 and 70–79.

*Primary Examiner*—A. McFarlane

[57] ABSTRACT

Methods are disclosed for selectively reducing the levels of hydrogen sulfide and organic sulfides from gaseous and/or liquid hydrocarbon streams, particularly natural gas streams, comprising contacting the streams with a composition comprising the reaction product of (i) a lower alkanolamine with (ii) a lower aldehyde.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 16, 18 and 20 are determined to be patentable as amended.

Claims 2-15, 17, 19 and 21, dependent on an amended claim, are determined to be patentable.

New claims 22-48 are added and determined to be patentable.

1. A method for selectively reducing the levels of hydrogen sulfide and organic sulfides present in gaseous or liquid hydrocarbon streams or mixtures thereof comprising contacting said streams with a composition comprising the reaction product of (i) an alkanolamine comprising 1 to about 6 carbons with (ii) an aldehyde comprising 1 to about 4 carbons, *in an amount and* for a period of time sufficient to *substantially* reduce the levels of hydrogen sulfide and organic sulfides in said streams.

16. A method for selectively reducing the levels of hydrogen sulfide, organic sulfides and water present in gaseous or liquid hydrocarbon streams or mixtures thereof comprising contacting said streams with a composition comprising (1) the reaction product of (i) an alkanolamine comprising 1 to about 6 carbons with (ii) an aldehyde comprising 1 to about 4 carbons and (2) a glycol, *in an amount and* for a period of time sufficient to *substantially* reduce the levels of hydrogen sulfide, organic sulfides and water in said streams.

18. A method for selectively reducing the levels of hydrogen sulfide and organic sulfides present in gaseous or liquid hydrocarbon streams or mixtures thereof comprising contacting said streams with a composition comprising a triazine, *in an amount and* for a period of time sufficient to *substantially* reduce the levels of hydrogen sulfide and organic sulfides in said streams.

20. A method for selectively reducing the levels of hydrogen sulfide, organic sulfides and water present in gaseous or liquid hydrocarbon streams or mixtures thereof comprising contacting said streams with a composition comprising a triazine and a glycol, *in an amount and* for a period of time sufficient to *substantially* reduce the levels of hydrogen sulfide, organic sulfides and water in said streams.

*22. A method according to claim 2 wherein said streams are gaseous hydrocarbon streams.*

*23. A method according to claim 22 wherein said streams are sour natural gas streams.*

*24. A method according to claim 17 wherein said streams are gaseous hydrocarbons streams.*

*25. A method according to claim 24 wherein said streams are sour natural gas streams.*

*26. A method according to claim 19 wherein said streams are gaseous hydrocarbon streams.*

*27. A method according to claim 26 wherein said streams are sour natural streams.*

*28. A method according to claim 21 wherein said streams are gaseous hydrocarbon streams.*

*29. A method according to claim 28 wherein said streams are sour natural gas streams.*

*30. A method according to claim 2 wherein said hydrogen sulfide is substantially completely removed from said streams.*

*31. A method according to claim 17 wherein said hydrogen sulfide is substantially completely removed from said streams.*

*32. A method according to claim 19 wherein said hydrogen sulfide is substantially completely removed from said streams.*

*33. A method according to claim 21 wherein said hydrogen sulfide is substantially completely removed from said streams.*

*34. A method according to claim 2 wherein said hydrogen sulfide is reduced to a level of about 3 ppm or less.*

*35. A method according to claim 17 wherein said hydrogen sulfide is reduced to a level of about 3 ppm or less.*

*36. A method according to claim 19 wherein said hydrogen sulfide is reduced to a level of about 3 ppm or less.*

*37. A method according to claim 21 wherein said hydrogen sulfide is reduced to a level of about 3 ppm or less.*

*38. A method according to claim 12 wherein said composition is contacted with said streams in an amount of about 0.05 to about 0.15 gallons per ppm $H_2S$ per MMscf of gas in the streams.*

*39. A method according to claim 38 wherein said composition is charged to said tower and contacted therein with a gaseous hydrocarbon stream to sweeten said stream until said composition is spent.*

*40. A method according to claim 39 wherein said spent composition is drained from the tower without need for cleaning of the tower.*

*41. A method according to claim 13 wherein said composition is injected into said streams at a rate of about 0.3 to about 1.0 gallons per ppm $H_2S$ per MMscf of gas in the streams.*

*42. A method for sweetening gaseous or liquid hydrocarbon streams or mixtures thereof containing hydrogen sulfide and organic sulfides comprising contacting said streams with a composition comprising the reaction product of (i) monoethanolamine and (ii) formaldehyde, for a period of time sufficient to sweeten said streams.*

*43. A method according to claim 42 wherein said reaction product comprises 1,3,5 tri-(2-hydroxyethyl)-hexahydro-S-triazine.*

*44. A method according to claim 42 wherein said streams comprise sour natural gas streams.*

*45. A method according to claim 44 wherein said composition is contacted with said streams in an $H_2S$ scrubber tower.*

*46. A method according to claim 45 wherein said composition is contacted with said stream in an amount of about 0.05 to about 0.15 gallons per ppm $H_2S$ per MMscf of gas in the streams.*

*47. A method according to claim 45 wherein said composition is charged to said tower and contacted therein with a gaseous hydrocarbon stream to sweeten said stream until said composition is spent.*

*48. A method according to claim 47 wherein said spent composition is drained from the tower without need for cleaning the tower.*

* * * * *